April 5, 1960 M. MEREDICH 2,931,445
HOE
Filed Aug. 7, 1957

INVENTOR.
MIKE MEREDICH
BY
*W. B. Harpman*
ATTORNEY

United States Patent Office 2,931,445
Patented Apr. 5, 1960

2,931,445

HOE

Mike Meredich, Youngstown, Ohio

Application August 7, 1957, Serial No. 676,869

2 Claims. (Cl. 172—375)

This invention relates to a hoe and more particularly to a hoe having a T-shaped blade and capable of breaking up clumps of soil with increased efficiency.

The principal object of the invention is the provision of a hoe having a novel blade forming cutting edges at right angles to one another tapered with respect to a common leading point or edge.

A further object of the invention is the provision of a hoe having a blade formed of a single piece of metal folded upon itself to form a hoe blade having a centrally positioned rearward extension.

A still further object of the invention is the provision of a blade which is T-shaped in cross section lending rigidity to the blade and enabling it to be used in chopping clods of earth and the like.

A still further object of the invention is the provision of a hoe having a circular member attached to the shank thereof adjacent the blade and useful in breaking up particles of earth, clay and the like.

The hoe disclosed herein comprises an improvement in garden hoes in that a blade of novel construction and utility is disclosed. The invention contemplates the provision of a hoe blade of heart-shape when viewed from the front and of T-shape when viewed from the bottom with the stem of the T-shape comprising a doubled metal section from which the blade is formed.

The shank of the hoe is extended downwardly along the junction line of the doubled metal shape to reinforce the hoe blade and lend it structural rigidity.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
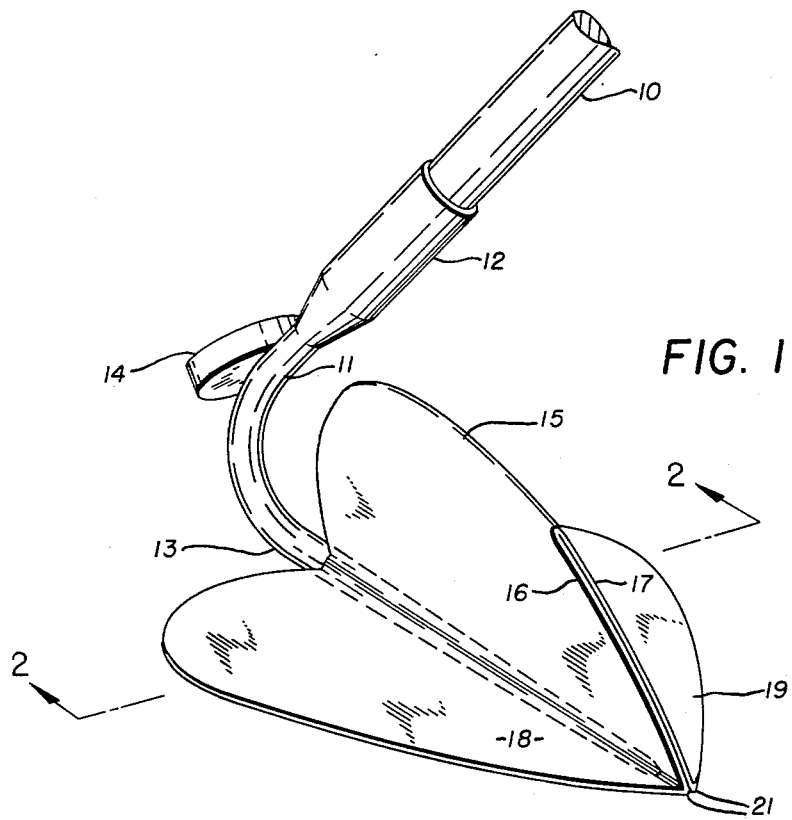
Figure 1 is a perspective view of the hoe with the handle thereof broken away.

By referring to the drawing and Figure 1 in particular it will be seen that the hoe comprises a handle 10 having a shank 11 secured thereto by means of a socket portion 12 formed thereon in which one end of the handle 10 is positioned. The shank 11 is curved and has a straight section 13 extending at an angle to the axis of the handle 10. A disc 14 is secured to the shank 11 adjacent the socket portion 12 and is adapted to be used in breaking clods of earth, clay and the like.

The blade of the hoe comprises a section of suitable metal folded on its center line 15 so as to form closely spaced wall sections 16 and 17 extending in face-to-face parallel position forwardly from the center line 15. Each of the wall sections 16 and 17 is bent outwardly in oppositely disposed relation to form blade sections 18 and 19, respectively, and the blade sections 18 and 19 and the wall sections 16 and 17 are secured to the straight portion 13 of the shank as by welding the same thereto at 20—20, as best seen in Figure 2 of the drawing.

The straight portion 13 of the shank extends along the center line of the blades 18 and 19 to a point near the foremost pointed ends 21 thereof thus lending rigidity to the structure and holding the blades 18 and 19 in fixed relation to one another.

Figure 2:
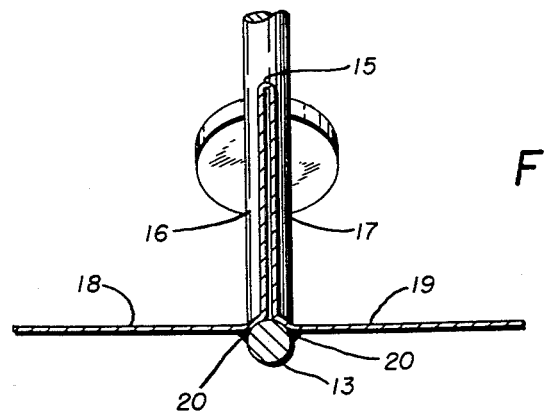
Figure 2 is a transverse section taken on line 2—2 of Figure 1 with parts broken away and parts in cross section.

It will thus be seen that the hoe disclosed herein presents a structurally strong blade assembly which is actually T-shaped in cross section, as best seen in Figure 2 of the drawing, and which is so formed that it resists bending and deflection to a greater degree than is possible with a single-blade device such as heretofore known in the art.

Additionally, by forming the blades 18 and 19 with the rearwardly extending sections 16 and 17, a third cutting edge is provided so that the hoe is more efficient in use. Each of the blades 18 and 19 and the face-to-face wall sections 16 and 17 are cut on angles so that the hoe forms a T-shaped member having a pointed, earth-engaging end section terminating at 21.

It will be seen that the hoe can be formed efficiently, inexpensively and meets the several objects of the invention.

Having thus described my invention, what I claim is:

1. A hoe comprising a shank having a socket portion formed at one end portion thereof, an elongated handle disposed within said socket and secured to said shank, the opposite end portion of said shank comprising an elongated straight tapered portion, said end portions being interconnected by a curved intermediate portion such that said straight tapered portion extends at an angle to the axis of the handle, a blade comprising a unitary body of metal folded along its center line and defining a pair of closely spaced wall portions extending in face-to-face substantially parallel position, an integral blade section disposed substantially normally from each of said wall portions along a line extending generally in the same direction as said fold line and spaced a substantial distance from the center fold line, said integral blade sections lying substantially in a common plane, each of said wall portions and the associated blade section being interconnected by an arcuate portion, said arcuate portions engaging said elongated tapered end portion of said shank, said blade being rigidly secured to said last-mentioned end portion of the shank, the blade including a rear portion adjacent the intermediate curved portion of said shank and an opposite forward portion spaced from the intermediate portion of said shank, said blade sections and said wall portions tapering toward one another to define a pointed forward end portion, said straight end portion of the shank extending along the center line of said blade to a point adjacent said forward pointed end thereby providing a rigid hoe structure.

2. Apparatus as defined in claim 1, including a disc secured to said shank adjacent to the socket portion of the shank for breaking up clods of earth or the like.

References Cited in the file of this patent

UNITED STATES PATENTS

| Re. 4,461 | Warren | July 4, 1871 |
| D. 31,633 | Baumgardner | Oct. 10, 1899 |
| 620,849 | Long | Mar. 7, 1899 |
| 810,987 | Spicer | Jan. 30, 1906 |
| 1,206,678 | Cribbs | Nov. 28, 1916 |
| 2,625,871 | Miller | Jan. 20, 1953 |

FOREIGN PATENTS

| 841,518 | Germany | June 16, 1952 |